United States Patent
Semprevivo et al.

(10) Patent No.: US 7,778,885 B1
(45) Date of Patent: Aug. 17, 2010

(54) SYSTEM AND METHOD OF ENHANCING LEADS

(75) Inventors: Stephen Principe Semprevivo, Los Angeles, CA (US); Matthew Robert Wells, Santa Monica, CA (US)

(73) Assignee: Lower My Bills, Inc., Santa Monica, CA (US)

( * ) Notice: Subject to any disclaimer, the term of this patent is extended or adjusted under 35 U.S.C. 154(b) by 0 days.

(21) Appl. No.: 11/633,662

(22) Filed: Dec. 4, 2006

(51) Int. Cl.
*G06Q 30/00* (2006.01)
(52) U.S. Cl. ..................................... 705/26
(58) Field of Classification Search .................. 705/26, 705/27
See application file for complete search history.

(56) References Cited

U.S. PATENT DOCUMENTS

| | | | |
|---|---|---|---|
| 5,842,178 A | 11/1998 | Giovannoli | |
| 5,930,764 A | 7/1999 | Melchione et al. | |
| 6,029,149 A | 2/2000 | Dykstra et al. | |
| 6,078,892 A | 6/2000 | Anderson et al. | |
| 6,208,979 B1 | 3/2001 | Sinclair | |
| 6,282,517 B1 | 8/2001 | Wolfe et al. | |
| 6,324,524 B1 | 11/2001 | Lent et al. | |
| 6,385,594 B1 | 5/2002 | Lebda et al. | |
| 6,611,816 B2 | 8/2003 | Lebda et al. | |
| 7,283,974 B2 | 10/2007 | Katz et al. | |
| 2004/0078323 A1* | 4/2004 | Johnston et al. | 705/38 |
| 2004/0143482 A1 | 7/2004 | Tivey et al. | |
| 2005/0131760 A1 | 6/2005 | Manning et al. | |
| 2005/0171859 A1 | 8/2005 | Harrington et al. | |
| 2006/0100944 A1* | 5/2006 | Reddin et al. | 705/35 |
| 2008/0015887 A1 | 1/2008 | Drabek et al. | |
| 2008/0109444 A1 | 5/2008 | Williams et al. | |
| 2008/0109445 A1 | 5/2008 | Williams et al. | |

FOREIGN PATENT DOCUMENTS

| | | |
|---|---|---|
| WO | WO9933012 | 7/1999 |
| WO | WO2006110873 | 10/2006 |

OTHER PUBLICATIONS

U.S. Appl. No. 11/683,688, filed Mar. 8, 2007, Semprevivo, et al.
U.S. Appl. No. 11/564,165, filed Nov. 28, 2006, Semprevivo, et al.
Dymi, Amilda; SourceMedia,Inc., May 2008; Special Report, P{g 24, VI. 17, No. 8; Need for Leads Spurs Some Upgrades.
Loshin; David; Intelligent Enterprise, Better Insight for Business Decisions; Feb. 9, 2000 vol. 3, No. 3; Value-Aded Data: Merge Ahead.

\* cited by examiner

*Primary Examiner*—Mila Airapetian
(74) *Attorney, Agent, or Firm*—Knobbe Martens Olson & Bear LLP

(57) ABSTRACT

A consumer lead enhancement system comprises a vendor criteria database, a web server, and a matching engine. The vendor criteria database is configured to store vendor criteria for receiving leads regarding consumers. The web server is configured to request from a consumer a first set of consumer characteristics and a second set of consumer characteristics. The matching engine is configured to compare the consumer characteristics with information in the vendor criteria database in order to match the consumer with one or more vendors so that the system is capable of generating a lead and transmitting the lead to the vendors. If the consumer provides the second set of consumer characteristics, the consumer may be matched to vendors based on the second set of consumer characteristics. Otherwise the consumer may be matched to vendors based on the first set of consumer characteristics.

14 Claims, 9 Drawing Sheets

Basic Loan Information

Property Zip Code　99999

Purchase Year　1990

Estimated Home Value　$ 200,001-210,000

1st Mortgage Balance　$ 80,001-85,000

1st Mortgage Interest Rate　6.00 %

Existing Type of Rate　Fixed / Adjustable / Don't Know

Do you have a 2nd Mortgage?　○ Yes　● No

Additional Loan Information

Purpose of Loan: Lower Monthly Payment / Lower Interest Rate / Change Terms

Gross Annual Income: $60,000–74,999

Employment Status: Employed / Self-employed / Retired

Filed Bankruptcy in Last 7 Years? ○ Yes ● No

Property Address: Street, State/City, Zip Code 99999

Email Address:

Get Qoutes

First Name

Last Name

Address

City

State

Zip Code  99999

Phone Numbers

Type  Home

Type  Cell

You have been matched!
Please select 3 of these 4 lenders to get your free quotes by checking or unchecking the boxes below:

☑ ABC Mortgage Co.
☑ The Home Loan Company
☑ Fast Loans
☐ ACME Lending

Click Here for your Free Quotes

*FIG. 7*

Confirm Results

Name: John Doe

SSN: ☐ - ☐ - ☐

Gross Income: 60,000-74,999

Co Borrower: No

Click Here to Confirm

Results

Get faster service from these lenders. Select 3 of 4 lenders by checking or unchecking the boxes below.

- ☑ ABC Mortgage Co.
- ☑ RapidLoans.com
- ☑ Kassle Funding Corp.
- ☐ Specialty Financing

FIG. 9

SYSTEM AND METHOD OF ENHANCING LEADS

BACKGROUND OF THE INVENTION

1. Field of the Invention

Embodiments of the systems and methods described herein relate to enhancing consumer leads.

2. Description of the Related Art

Consumer lead generation is a large and growing industry. The lead generation industry identifies individual or business consumers that may be interested in buying products or services and sells contact information for those consumers to providers of the products or services. For example, a residential loan lead generation company, such as LowerMyBills.com, identifies consumers interested in getting a residential loan and sells the consumers' contact information to lenders of residential loans. The contact information of the potentially interested buyer is known as a "lead."

Lead generation companies sell leads for many products and services, including residential loans, commercial loans, real estate agents, automobiles, attorneys, housecleaners, and many other products and services. Providers of such products and services buy leads because leads effectively identify consumers that are already interested in the providers' products and services. Accordingly, leads often result in more sales than advertising, cold calling, or other forms of salesmanship.

The value of a lead depends, at least partially, on the level of detail that the lead conveys about the consumer. For example, a lead that includes detailed information about a consumer's credit history may be more valuable than a lead that includes only the consumer's contact information and an estimate of the consumer's creditworthiness. While lead generation companies therefore have an incentive to seek detailed consumer information, some consumers may reject attempts to obtain detailed or sensitive information. Accordingly, a lead generation company that seeks detailed or sensitive consumer information directly from consumers may obtain fewer leads than a company that seeks less detailed information.

SUMMARY

In this application we describe embodiments of systems and methods of enhancing leads with detailed consumer information while not jeopardizing basic information that can be easily obtained from most consumers. In general, the systems and methods first seek to generate a standard lead by requesting basic information from a consumer. The basic information is sufficient to generate a valuable lead but is general enough that most consumers feel comfortable providing the information. After obtaining the basic information, the systems and methods generally seek to generate an enhanced lead by requesting more detailed information from the consumer.

These systems and methods potentially increase the value of each lead while reducing the risk of losing a lead altogether. If the consumer agrees to provide more detailed information, an enhanced lead can be provided to a lead buyer (at a higher price). If the consumer does not want to provide the detailed information, a standard lead can still be provided to a lead buyer (at a lower price). Lead generation companies benefit by selling more leads. Lead buyers benefit because they have an option to buy more detailed leads at a higher price or less detailed leads at a lower price. Consumers benefit because they can choose higher or lower quality matching with vendors based on the level of information that they are willing to disclose about themselves.

One lead enhancement system comprises a matching engine, a vendor criteria database, and a web server. The web server interacts with a consumer over a network, such as the Internet, to obtain consumer information from the consumer. The vendor criteria database comprises information about criteria that define characteristics of consumers with whom each vendor wants to be matched. For example, in the context of lending, a lender's criteria may specify that the lender wants to be matched with consumers that have excellent credit and that seek a home purchase loan for more than $300,000. In the context of selling cars, a car dealer's criteria may specify that the dealer wants to be matched with consumers that want to buy a new Honda car with a Manufacturer's Suggested Retail Price of at least $15,000.

One variant of the vendor criteria database stores separate criteria for standard leads and enhanced leads. Some vendors may not have criteria for standard leads because they only want to receive enhanced leads. Other vendors may only want to receive standard leads and may therefore have criteria only for standard leads. Still other vendors may want to receive both types of leads but may have different criteria for the standard leads they are willing to accept than for the enhanced leads that they want. For example, in the context of lending, a lender may accept standard leads only for consumers with excellent credit but may accept enhanced leads for consumers with above-average but not excellent credit.

The matching engine generally compares consumer characteristics related to a lead with information in the vendor criteria database in order to match consumers with particular vendors. The matching engine thus enables the system to designate which vendors receive which leads and to transmit the leads to the vendors. In one advantageous variant, the matching engine distinguishes between standard leads and enhanced leads, and applies appropriate standard or enhanced criteria in the matching process.

In one embodiment, the web server is configured to obtain basic consumer information from the consumer. The web server may obtain such information by serving one or more web pages to the consumer that include web-based forms that seek particular information. The basic information sought generally includes at least contact information sufficient to allow a vendor to contact the consumer. The basic information may also include information that is general enough that most consumers feel comfortable providing the information. Advantageously, the basic information is sufficient to generate a valuable lead even if no further information is obtained from the consumer.

One variant of the web server is also configured to seek more detailed consumer information after first obtaining the basic information. The web server may seek such information by serving one or more web pages to the consumer that invite the consumer to provide more detailed information. The detailed information sought generally includes more sensitive information, such as the consumer's Social Security number, that the system may use to obtain much more information about the consumer. For example, in one embodiment the system may use the consumer's Social Security number to obtain a credit report about the consumer and to include information from the credit report in the lead. Alternatively or additionally, the additional consumer information may be used to more accurately match the consumer with vendors. For example, in one embodiment, the additional consumer information includes a credit score that is used to provide a better match of the consumer with lenders. The web server may advantageously be configured to generate a standard lead from the basic information if the consumer chooses not to provide enough detailed information to generate an enhanced lead.

Herein we describe examples or embodiments of systems and methods to enhance leads such that a skilled artisan will understand a few different ways to make and use the invention. However, the invention is not limited to just the described embodiments. Rather, the invention encompasses each disclosed embodiment individually, any combination or subset of the disclosed embodiments, and any variation of the disclosed embodiments that is appreciated by a skilled artisan in light of this disclosure. For example, while we describe many advantageous features and components, a skilled artisan will appreciate, in light of this disclosure, that these features and components are not necessary parts of every embodiment, but can be omitted from or changed in some embodiments.

BRIEF DESCRIPTION OF THE DRAWINGS

FIG. 5 is a simplified screen shot that requests from the consumer additional basic information about the desired loan.

FIG. 6 is a simplified screen shot that requests from the consumer additional basic information.

FIG. 7 is a simplified screen shot that requests from the consumer additional basic information.

FIG. 9 is a simplified screen shot that asks the consumer to confirm the more detailed information.

DETAILED DESCRIPTION OF PREFERRED EMBODIMENTS

Figure 1:
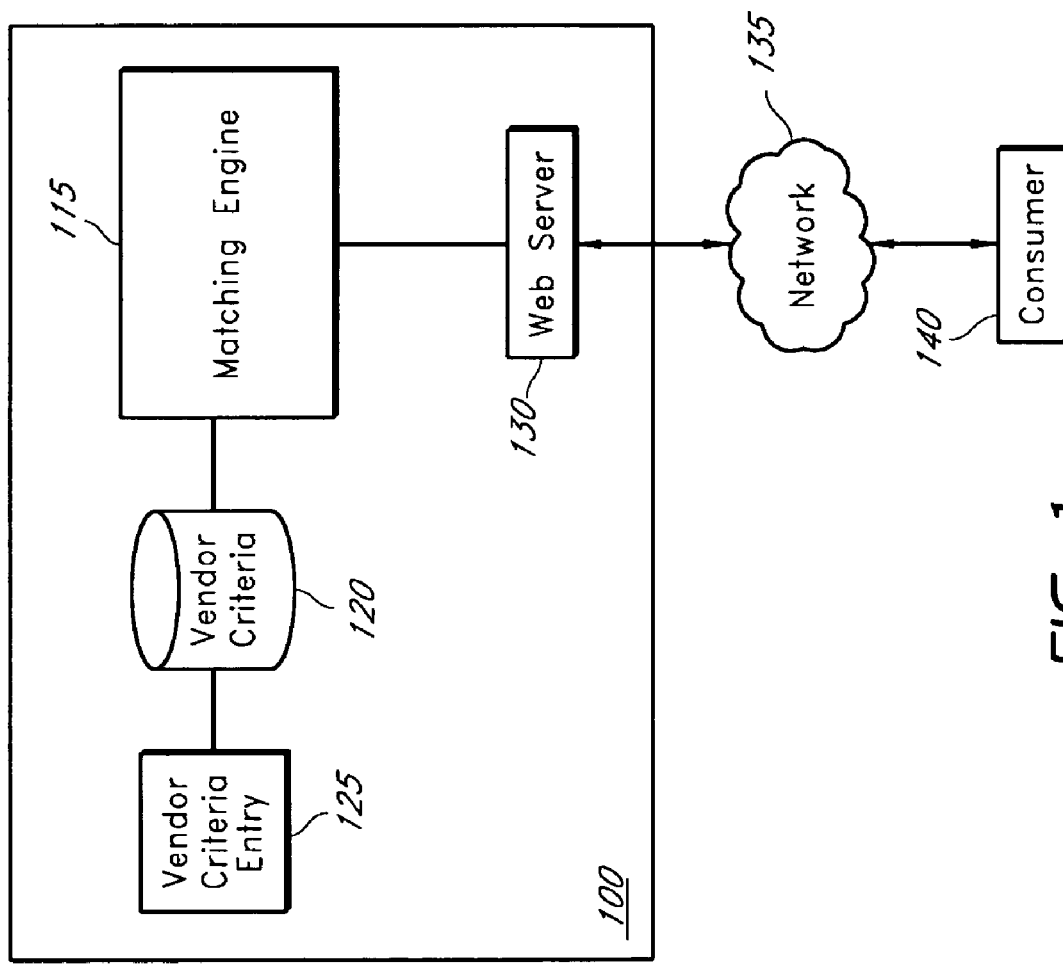
FIG. 1 is a block diagram that illustrates one implementation of a lead enhancement system connected to a network.

FIG. 1 is a block diagram that illustrates one implementation of a lead enhancement system connected to a network. The lead enhancement system 100 of FIG. 1, and the embodiments of other figures, may be implemented in the context of a loan lead generation system such as the web site operated by LowerMyBills.com. We offer this context to illustrate one concrete application of the lead enhancement system 100 in order to help a skilled artisan understand how the lead enhancement system 100 may be used in practice. Further, the simplified example screen shots of FIGS. 4 to 9 are in the context of a loan lead generation system. The invention, however, is not limited to enhancing leads for the lending industry. Rather, a skilled artisan will appreciate, in light of this disclosure, that the systems and methods described herein can be used to enhance any kind of leads, including, without limitation, leads for residential loans, commercial loans, real estate agents, automobiles, attorneys, housecleaners, or any other product or service. The term "vendor" refers broadly to any potential lead buyer, of whatever industry, that offers one or more products or services.

To further illustrate a concrete application of the lead enhancement system 100, we describe the lead enhancement system 100 in the context of a lead generation system that generates leads using the Internet. An example of such a lead generation system is found on the web site operated by LowerMyBills.com. This site prompts a consumer interested in obtaining a loan to enter his own contact information into a web-based form and sends the contact information to a group of matched lenders selected by the consumer. Accordingly, we generally describe a "web server" interacting with the consumer to receive consumer information. However, the invention is not limited to systems that generate leads using the Internet. Rather, a skilled artisan will appreciate, in light of this disclosure, that leads can be generated, consistently with the invention, without using a "web server," but instead using any server on a network that is not the Internet, a stand-alone computer, a kiosk such as an automated teller machine, a touch tone telephone entry system, by communication between the consumer 140 and a person at a call center who enters information on the consumer's behalf, or the like.

In one embodiment, components of an Internet-based lead generation system include a matching engine 115, a vendor criteria database 120, a vendor criteria entry component 125, and a web server 130. In general, the lead generation system generates a lead when a consumer 140 accesses the web server 130 over a network 135 such as the Internet. The web server 130 serves web pages that prompt the consumer 140 to enter his contact information into a web-based form. The consumer 140 may also be prompted to enter other information to assist the system to match the consumer 140 with vendors that offer the products or services that the consumer 140 wants.

Generally, the vendor criteria database 120 includes criteria that define characteristics of consumers with whom each vendor wants to be matched. In the context of lending, a lender's criteria may specify that the lender wants to be matched with consumers that have excellent credit and that seek a home purchase loan for more than $300,000. In the context of selling cars, a car dealer's criteria may specify that the dealer wants to be matched with consumers that want to buy a new Honda car with a Manufacturer's Suggested Retail Price of at least $15,000.

One variant of the vendor criteria database 120 stores separate criteria for standard leads and enhanced leads. Some vendors may not have criteria for standard leads because they only want to receive enhanced leads. Other vendors may only want to receive standard leads and may therefore have criteria only for standard leads. Still other vendors may want to receive both types of leads but may have different criteria for the standard leads they are willing to accept than for the enhanced leads that they want. For example, in the context of lending, a lender may accept standard leads only for consumers with excellent credit but may accept enhanced leads for consumers with above-average but not excellent credit.

The term "database," as used with respect to the vendor criteria database 120, encompasses any group of data that stores information about vendor criteria. The vendor criteria database 120 need not require Structured Query Language ("SQL"), a relational database management system, or any other query language or database management system, for accessing the information stored therein. Moreover, the vendor criteria database 120 is not limited to any particular format. Rather, the vendor criteria database 120 may be a simple text file that has an entry on each line or multiple entries on a single line separated by commas, tabs, semicolons, or the like. Alternatively, the vendor criteria database 120 may comprise all or portions of many computer files stored in one or more directories or folders.

Generally, the matching engine 115 comprises computer-executable instructions stored on a computer-readable medium that are configured, when executed by a general-purpose computer, to match the consumer 140 with one or more vendors based on vendor criteria and characteristics of the consumer 140. Alternatively, the matching engine 115 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "matching engine" encompasses all of these implementations.

In one embodiment, the matching engine 115 matches the consumer 140 with vendors by comparing characteristics of the consumer 115 with vendor criteria stored in the vendor criteria database 120. The matching engine 115 may require an exact match (e.g. the consumer 140 meets all of a vendor's criteria) or the matching engine 115 may make matches that are close but not exact (e.g. the consumer 140 meets an acceptable level of the vendor's criteria). In some cases the matching engine 115 may match the consumer 140 with only one vendor, while in others the matching engine 115 may match the consumer 140 with multiple vendors. An advantage of matching with just one vendor is that the vendor gets an exclusive lead that likely has more value than a lead that the vendor shares with other vendors. An advantage of matching with multiple vendors is that the vendors may compete with each other to win the consumer's business, which may result in a better price for the consumer. In some cases, the matching engine 115 may not be able to make any matches because the consumer 140 may have characteristics that do not match any vendor's criteria.

Accordingly, the matching engine 115 generally enables the system to designate which vendors receive which leads and to transmit the leads to the vendors. In one advantageous variant, the matching engine distinguishes between standard leads and enhanced leads, and applies appropriate standard or enhanced criteria in the matching process.

Generally, the vendor criteria entry component 125 comprises computer-executable instructions stored on a computer-readable medium that are configured, when executed by a general-purpose computer, to allow a user to update the vendor criteria database 120. Alternatively, the vendor criteria entry component 125 may be implemented as a hardware component, a firmware component, or a component that is some combination of hardware, firmware, and software, that performs the equivalent function. A skilled artisan will understand that hardware, firmware, software, or combination implementations are equivalent, and will understand how to make and use any of these implementations. The term "vendor criteria entry component" encompasses all of these implementations. In one embodiment, the vendor criteria entry component 125 is accessible to a plurality of vendors over a network such that the vendors can directly update their own criteria. Alternatively, the vendor criteria entry component 125 is not accessible to the vendors, such that a person or automated process affiliated with the lead generation system must update the vendor criteria database 120.

The consumer 140 characteristics may be collected in many ways. One way to collect the consumer 140 characteristics is to have the consumer 140 fill out a web-based form served by the web server 130. The consumer 140 may be asked, for example, to provide his contact information and information about his creditworthiness, job, income, interests, and the like. In some cases the consumer 140 may be asked to estimate some of these characteristics rather than provide an exact value. A skilled artisan will appreciate, in light of this disclosure, that the characteristics requested differ based on the type of lead that is being generated and the type of information that vendors care about for qualifying a consumer as a potential buyer. Thus, in the context of mortgage loans, creditworthiness is an important characteristic. However, in the context of a product such as a computer that the consumer 140 will likely purchase using cash or a credit card, creditworthiness is less important.

Another way to collect the consumer 140 characteristics is to look up information about the consumer 140 stored in a database. An example of this approach is to request a credit report for the consumer 140 after obtaining the Social Security number from the consumer 140. Still other ways to collect consumer 140 characteristics exist outside of the context of web-based lead generation systems. For example, the consumer 140 can be asked to provide information using a network that is not the Internet, using a stand-alone computer, using a kiosk such as an automated teller machine, using a touch tone phone entry system, by communicating with a person at a call center, or using any other device configured to collect information.

A web-based lead generation system, such as the example described above, is a preferred way to collect leads for sending to vendors. However, while we describe embodiments of a lead enhancement system 100 in the context of such a web-based lead generation system, the lead enhancement system 100 can be used to enhance leads generated in other ways.

As has been described generally, in one variant of the lead enhancement system 100, the web server 130 receives basic information from the consumer 140. The basic information is sufficient to generate a valuable lead. However, after receiving the basic information, the web server 130 seeks more detailed information from the consumer 140. In cases in which the consumer 140 agrees to provide the more detailed information, the system 100 is able to generate an enhanced lead that may be sold for a higher price than a standard lead generated from the basic information. In cases in which the consumer 140 declines to provide more detailed information, the system 100 is still able to generate a standard lead. Advantageously, therefore, the system 100 provides the opportunity to generate an enhanced lead without taking the risk of losing a lead entirely in cases where the consumer 140 is not willing to provide the more detailed information.

Figure 2:
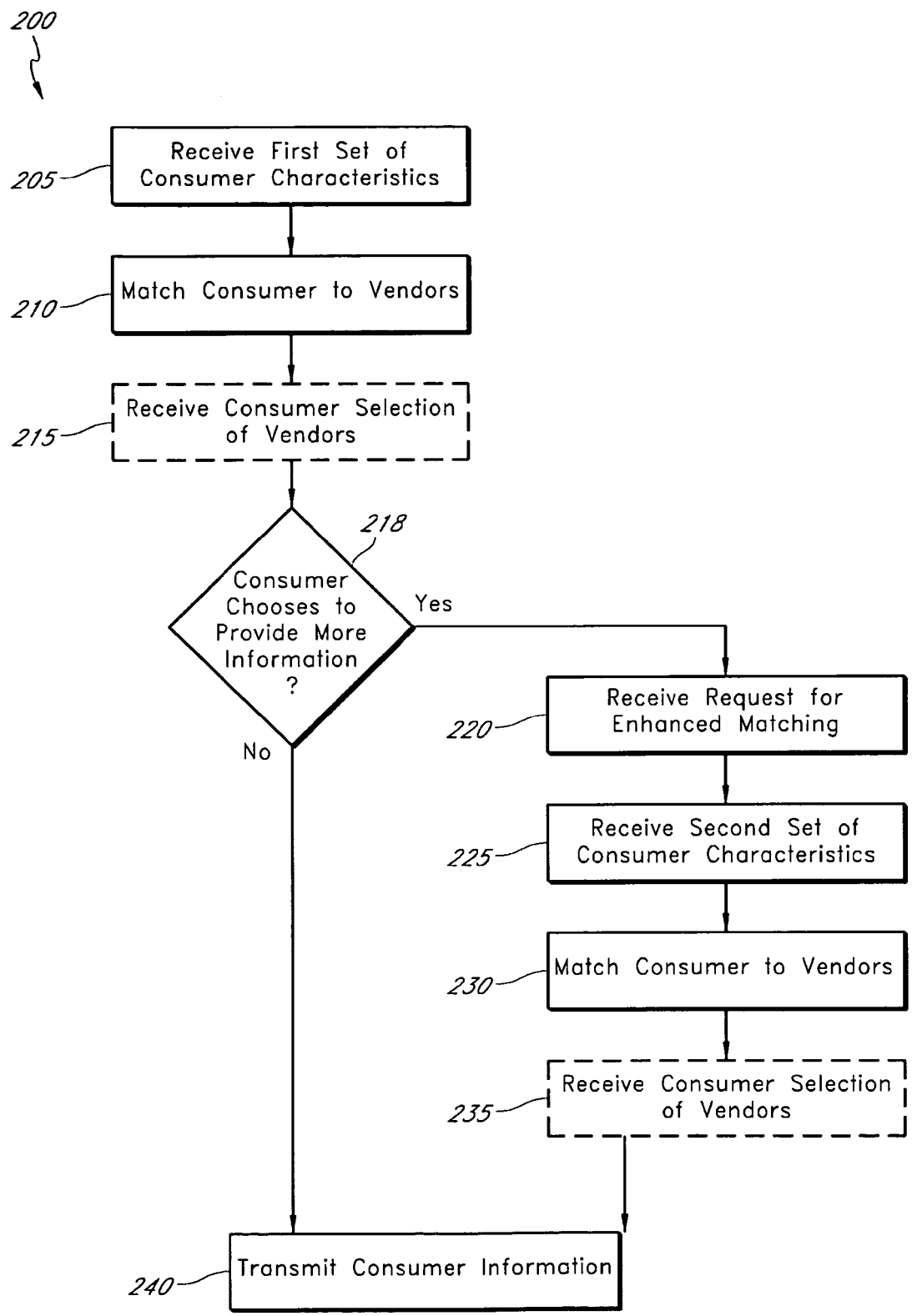
FIG. 2 is a flowchart that illustrates one process of lead enhancement.

FIG. 2 is a flowchart that illustrates one process of lead enhancement. A process of lead enhancement 200 may be performed by the system 100 of FIG. 1 or it may be performed by another system. The process 200 begins, in a block 205, by receiving a first set of consumer characteristics. In one variant, the first set of consumer characteristics comprises basic information about the consumer. Preferably, the basic information excludes detailed or sensitive information so that the requested information will deter as few consumers as possible from entering the information, while still obtaining enough information to generate a valuable lead. For example, in one embodiment, the basic information comprises contact information and estimates of the consumer's creditworthiness, but excludes more sensitive information such as a detailed credit report or the consumer's Social Security number. A skilled artisan will appreciate, in light of this disclosure, that consumers differ in the types of information that they are willing to provide, and that some particularly sensitive consumers may not even be willing to provide a name, address, or telephone number. Accordingly, while the process 200 seeks to deter as few consumers as possible while still obtaining enough information to generate a valuable lead, it is, in many cases, inevitable that some consumers will be unwilling to provide even the basic information.

In a block 210, the process 200 matches the consumer with one or more vendors. In one variant, the matching engine 115 performs this step in cooperation with the vendor criteria database 120, as described above with respect to FIG. 1. In a block 215, the process 200 receives a consumer selection of a subset of the matched vendors. In one embodiment, the consumer is presented with a list of matched vendors and is asked to select a specific number of matched vendors, such as, for example, one fewer than the total number of matched vendors. Advantageously, presenting the list of matched vendors to the consumer and allowing selection of a subset gives the consumer control over which vendors receive the consumer's information. For example, if the consumer does not want a particular listed vendor to receive the consumer's information, the consumer can exclude that vendor from those that the consumer selects. Alternatively, after viewing the list, the consumer can decide not to have consumer information sent to any of the vendors.

While it is advantageous to allow the consumer to choose a subset of matched vendors, it is not required. Block 215 can be omitted entirely such that the process 200 transmits consumer information to the matched vendors without consumer intervention. Alternatively, the process 200 may transmit consumer information to the matched vendors after allowing the consumer to intervene by approving or rejecting the list of vendors. In this variant, the consumer can decline to have the consumer information transmitted after viewing the list of vendors, but cannot individually designate which vendors receive the information.

Depending on whether the consumer chooses to provide more detailed information, the process 200 proceeds either to a block 220 or to a block 240. In one embodiment, the process 200 determines whether the consumer provides more detailed information (e.g. a second set of consumer characteristics) or declines to provide such additional information prior to proceeding to either the block 220 or the block 240. In one embodiment, the process 200 may determine that a consumer has declined to provide the additional information if it receives an affirmative indication from the consumer that the consumer declines to provide the additional information. Alternatively or additionally, the process 200 may determine that a consumer has declined to provide the additional information if a timeout occurs (e.g. the consumer is given a certain amount of time to provide the information and the consumer does not provide the information within that time). In one embodiment, the web server 130 performs the operation of determining whether the consumer has provided or declined to provide more detailed information.

If the consumer chooses not to provide more detailed information, the process 200 proceeds to the block 240, in which consumer information is transmitted to the matched vendors or to the consumer-selected subset of matched vendors. If the consumer chooses to provide more detailed information, the process 200 proceeds to the block 220, in which a request for enhanced matching is received. The request may be received in various ways. In one variant, the consumer is prompted to fill in more detailed information and the consumer chooses whether or not to provide the information. If the user does provide the information, this is treated as a request for enhanced matching. In another variant, the process 200 asks the consumer whether the consumer desires to enter more information to participate in enhanced matching. If the consumer responds affirmatively to such a query, the process 200 then presents the consumer with form or other means for providing more detailed information.

In a block 225, the process 200 receives a second set of consumer characteristics. In one embodiment, the second set of consumer characteristics is more detailed or more sensitive than the basic information of the first set of consumer characteristics. One example of a sensitive consumer characteristic that may be included in this second set is a consumer's Social Security number. A Social Security number may be used to obtain even more detailed information about a consumer, such as, for example, a consumer's partial or complete credit report. Accordingly, in one embodiment the process 200 includes the operation of obtaining more detailed information about the consumer from a third party such as a credit bureau, a public agency or private company that maintains public records, an entity that maintains medical records, an entity that maintains financial records, an entity that maintains student records including transcripts, or the like. Provided that the process 200 has sufficient information for the third party to obtain the additional information (and, in some cases, that the consumer has consented to the information being provided), the process 200 can obtain any information maintained by any entity. The process 200 may obtain the information by using the protocols or procedures provided by the third party information providers for accessing the information. For example, for some third parties who offer electronic means to access information, the process 200 may include electronically requesting information in the manner specified by the third party.

In one embodiment, the process 200 obtains at least a credit score from a credit bureau in real-time. The process 200 may also obtain additional information, such as a partial or complete credit report, in real-time. Advantageously, obtaining such information in real-time allows for the generation of an enhanced lead and matching the consumer with vendors to receive the enhanced lead during the consumer's session. In one embodiment, the process 200 obtains a credit score in real-time from the credit bureau Experian. In this embodiment, the system 100 that performs the process 200 connects to an Experian consumer or credit database and retrieves the credit score. Connection to Experian is not required. The system 100 may also connect to another credit bureau or connect to no credit bureau. The system 100 may connect to another third party information provider that is not a credit bureau, such as, for example, an information provider that provides public records such as home purchase records.

In a block 230, the process 200 proceeds to match the consumer to one or more vendors, essentially as described with respect to the block 210. The matching in the block 230, however, takes into account at least some of the second set of characteristics. Further, the matching in the block 230 may be based on separate criteria stored in the vendor criteria database 120. In a block 235, the process 200 proceeds to receive consumer selection of a subset of vendors, essentially as described with respect to the block 215. As with the block 215, the block 235 may be omitted entirely.

In the block 240, the process 200 proceeds to transmit the consumer's information to the matched vendors or to the consumer-selected subset of matched vendors. Advantageously, whether or not the consumer provides the more detailed second set of consumer characteristics, the process 200 is able to provide a valuable lead to one or more vendors. If the consumer does not provide the more detailed information, the process 200 can send a standard lead based solely on the basic first set of characteristics. If the consumer does provide the more detailed information, the process 200 can send an enhanced lead.

As illustrated by FIG. 2, the process 200 matches the consumer with vendors after receiving the first set of consumer characteristics and again after receiving the second set of consumer characteristics. Advantageously, matching the consumer with vendors twice in this fashion increases the chances that the process 200 can generate a valuable lead even if the consumer does not want to enter the more detailed information of the second set of consumer characteristics. That is because a match has already occurred when the consumer is asked to enter more detailed information, and the match is not lost if the consumer logs off or otherwise declines to enter the more detailed information. If the process 200 asked the consumer to enter more detailed information before performing the match, there is increased risk that the consumer will not go forward with the match at all.

While it is advantageous to perform two separate matches as described above, it is not required. Alternatively, the process 200 may match the consumer with vendors just once. That is, the process 200 may, after receiving the first set of consumer characteristics, ask the consumer whether he wants to be matched with vendors based on the basic information or whether he wants to enter more detailed information to receive a better match. If the consumer chooses to be matched based on the basic information, the process 200 would immediately perform the matching process. If the consumer chooses to enter more information, the process 200 would wait to receive the additional information before proceeding to perform the matching process.

Figure 3:
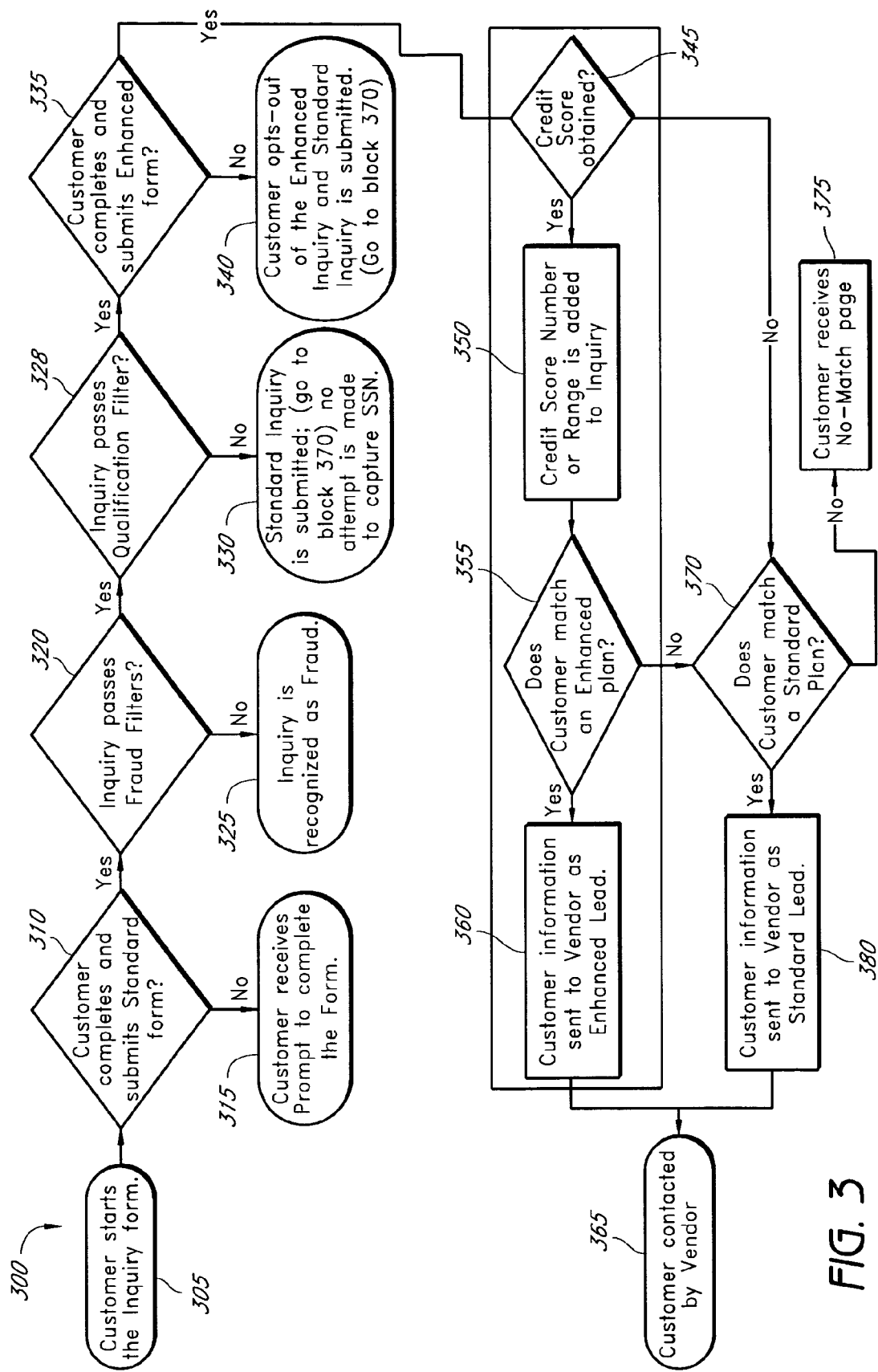
FIG. 3 illustrates one variant of a process of lead enhancement in the context of a loan lead generation process.

FIG. 3 illustrates one variant of a process of lead enhancement in the context of a loan lead generation process. We describe this process to provide a concrete example of how a lead enhancement process can be used in a particular industry. However, as will be appreciated by a skilled artisan in light of this disclosure, the process can be used in many other industries as well. A skilled artisan will appreciate, in light of this disclosure, appropriate modifications for using the process in other contexts.

A process of lead enhancement 300 begins, in a block 305, when the customer starts an inquiry form. An inquiry form requests basic information about the customer. In a decision block 310, the process 300 determines whether the customer has completed a standard inquiry form. If the customer has not completed a standard inquiry form, the process 300 proceeds, in a block 315, to prompt the customer to complete the standard inquiry form. If the customer has completed the standard inquiry form, or if the consumer completes the standard inquiry form upon being prompted in the block 315, the process 300 proceeds, in a decision block 320, to determine whether the inquiry passes fraud filters. In one embodiment, the fraud filters detect indications that an inquiry may be fraudulent or erroneous. Such fraud filters are generally well known to skilled artisans. If the inquiry does not pass the fraud filters, then the process 300 recognizes the inquiry as fraudulent or erroneous. The transaction either terminates or the customer is given a chance to correct the inquiry.

If the inquiry passes the fraud filters, or corrects any detected errors, the process 300 proceeds, in a decision block 328, to determine whether the inquiry passes a qualification filter. In one embodiment, the qualification filter ensures that the customer meets basic eligibility requirements for completing an enhanced form. In one embodiment, such basic eligibility requirements include that the consumer 140 is located in a state in which the system 100 is licensed to collect the information requested from the consumer. If the inquiry does not pass the qualification filter, the customer is not eligible to fill out an enhanced form, and the process 300 proceeds, in a block 330, to submit the standard inquiry without attempting to capture more detailed information such as the consumers Social Security number.

If the inquiry passes the qualification filter, the process 300 proceeds, in a decision block 335, to determine whether the customer has completed an enhanced form. If the customer has not completed the enhanced form (opts out of completing the enhanced form), the process 300 proceeds to submit a standard inquiry in a block 340. If the customer has completed the enhanced form, then the process 300 will have obtained more detailed information about the customer, such as, for example, a Social Security number, from the customer (step not shown). With the more detailed information, the process 300 may request still more information, such as a credit score or credit report, from a third party provider. In a variant that seeks to obtain a credit score, the process 300 proceeds, in a decision block 345, to determine whether a credit score has been obtained.

If a credit score was obtained, the process 300 proceeds, in a block 350, to add credit information to the inquiry. In one embodiment, the credit information comprises a credit score, but any other credit information may be added in place of or in addition to a credit score. The process 300 then proceeds, in a decision block 355, to determine whether the customer matches an enhanced plan. In one embodiment, the customer matches an enhanced plan when the customer's characteristics meet at least one vendor's criteria for receiving an enhanced lead. If the customer matches an enhanced plan, the process 300 proceeds, in a block 360, to send an enhanced lead to one or more vendors. The customer may then be contacted by the vendors, as illustrated in the block 365.

If, on the other hand, it is determined in the block 345 that a credit score has not been obtained, the process 300 proceeds, in a decision block 370, to determine whether the customer matches a standard plan. The process 300 also proceeds to the decision block 370 under any of the following circumstances: (1) the block 328 determines that the inquiry does not pass the qualification filter, (2) the block 335 determines that the customer did not complete the enhanced form, or (4) the block 355 determines that the customer does not match an enhanced plan. In one embodiment, the customer matches a standard plan when the customer's characteristics meet at least one vendor's criteria for receiving a standard lead. If the customer does not match a standard plan, the process 300, in a block 375, informs the customer that the customer was not matched with any vendors, and the process 300 ends. If the customer matches a standard plan, the process 300 proceeds, in a block 380, to transmit the customer's information to one or more vendors as a standard lead. The vendors can then contact the customer, as illustrated in the block 365.

FIGS. 4 to 9 are simplified screen shots that illustrate screens presented to the consumer by one embodiment of the lead enhancement system. The illustrated embodiment is in the context of a loan lead enhancement system. A skilled artisan will appreciate, in light of this disclosure, that the lead enhancement system can be used for enhancing leads in any industry. A skilled artisan will understand appropriate modifications for using the lead enhancement system for other types of leads besides loan leads.

Figure 4:
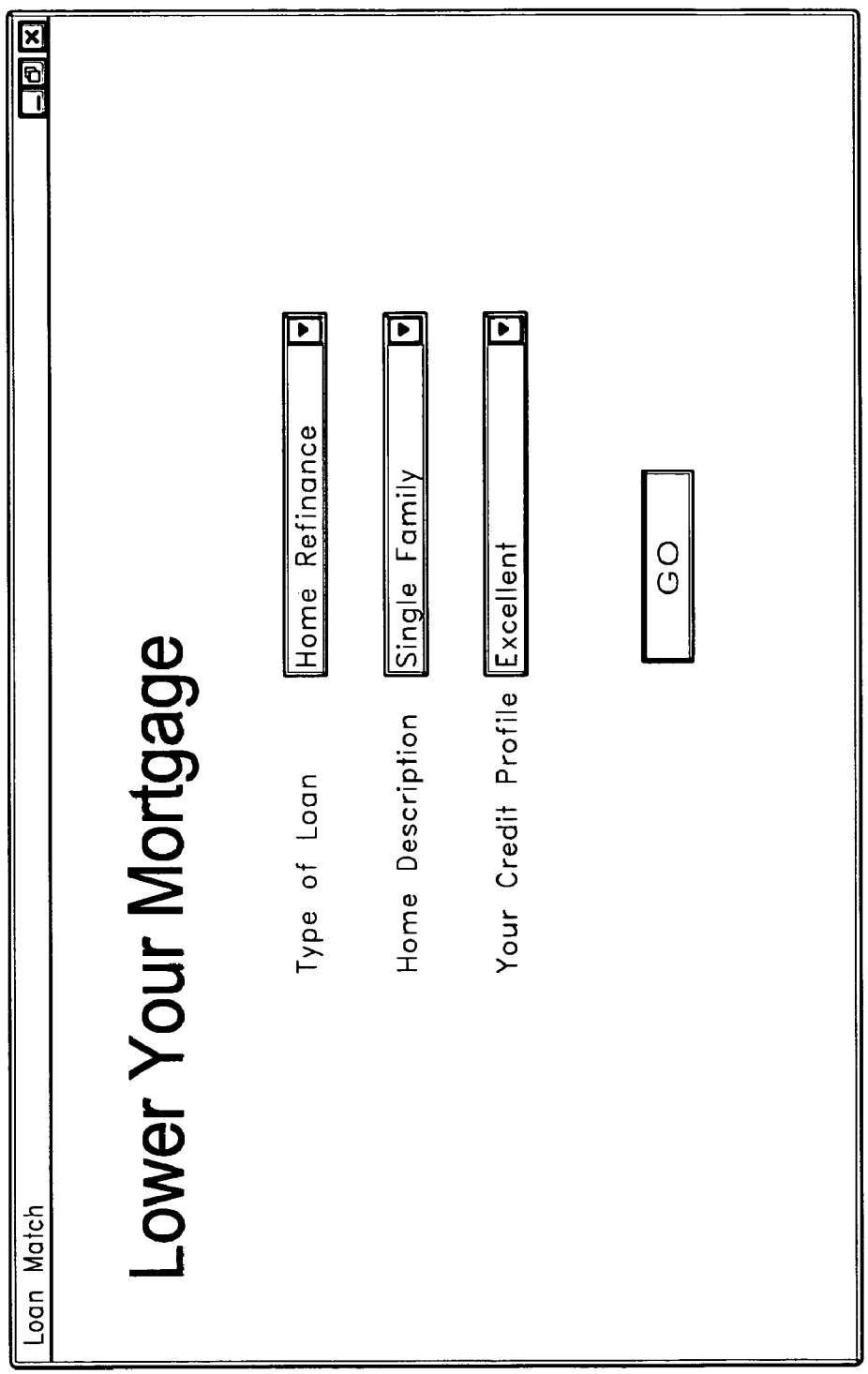
FIG. 4 is a simplified screen shot that requests from the consumer very basic information about a desired loan and the consumer's creditworthiness.

FIG. 4 is a simplified screen shot that requests from the consumer very basic information about a desired loan and the consumer's creditworthiness. Specifically, as illustrated, the screen asks the consumer to choose a type of loan, a home description, and the consumer's credit profile. The consumer's credit profile is the consumer's estimate of his creditworthiness. As illustrated, the consumer is requested to provide a broad estimate of creditworthiness using broad classifications such as excellent, good, fair, or poor. Alternatively, the consumer may be asked to provide a more precise indicator, such as an estimated credit score. Broad classifications are generally better for consumer-provided data, because many consumers do not precisely know their creditworthiness.

FIG. 5 is a simplified screen shot that requests from the consumer additional basic information about the desired loan. In one embodiment, this screen is presented to the consumer after the consumer has completed the screen of FIG. 4. As illustrated, this screen asks the consumer to provide the property's zip code, purchase year, estimated home value, $1^{st}$ mortgage balance, $1^{st}$ mortgage interest rate, existing type of rate, and whether the consumer has a $2^{nd}$ mortgage. In the illustrated embodiment, the consumer is provided general ranges from which to choose for some of the fields, such as the estimated home value and the $1^{st}$ mortgage balance.

FIG. 6 is a simplified screen shot that requests from the consumer additional basic information. In one embodiment, this screen is presented to the consumer after the consumer has completed the screen of FIG. 5. As illustrated, this screen asks the consumer to choose a loan purpose, the consumer's gross annual income (within predefined ranges), the consumer's employment status, whether the consumer has filed bankruptcy in the last 7 years, the property address, and the consumer's email address.

FIG. 7 is a simplified screen shot that requests from the consumer additional basic information. In one embodiment, this screen is presented to the consumer after the consumer has completed the screen of FIG. 6. As illustrated, this screen asks the consumer to provide his or her first name, last name, address, city, state, zip code, and phone numbers. Also, in this embodiment, the matching process occurs just prior to the presentation of the screen of FIG. 7. Thus, as illustrated, FIG. 7 presents to the consumer a list of the vendors with whom the consumer has been matched. In the illustrated case, the consumer was matched with 4 lenders, as listed. In this embodiment, the consumer is allowed to choose a subset of the lenders to whom the system will send the consumer's information. Specifically, in this embodiment, the screen asks the consumer to select 3 of the 4 matched lenders by checking or unchecking check boxes.

As shown by the embodiments of the screens of FIGS. 4 to 7, the system may present multiple forms to the consumer that request basic information. Presenting multiple forms is not a requirement of the invention. Further, the specific data fields illustrated in FIGS. 4 to 7 are not required by the invention. Rather, the system may request any data fields using as many pages as are deemed important for obtaining information sufficient to generate a valuable lead and for matching the consumer with vendors. A skilled artisan will appreciate, in light of this disclosure, that the amount and type of information deemed important may change from industry to industry. In some cases, nothing more than contact information sufficient to contact the consumer, such as, for example, an email address, may be sufficient.

Figure 8:
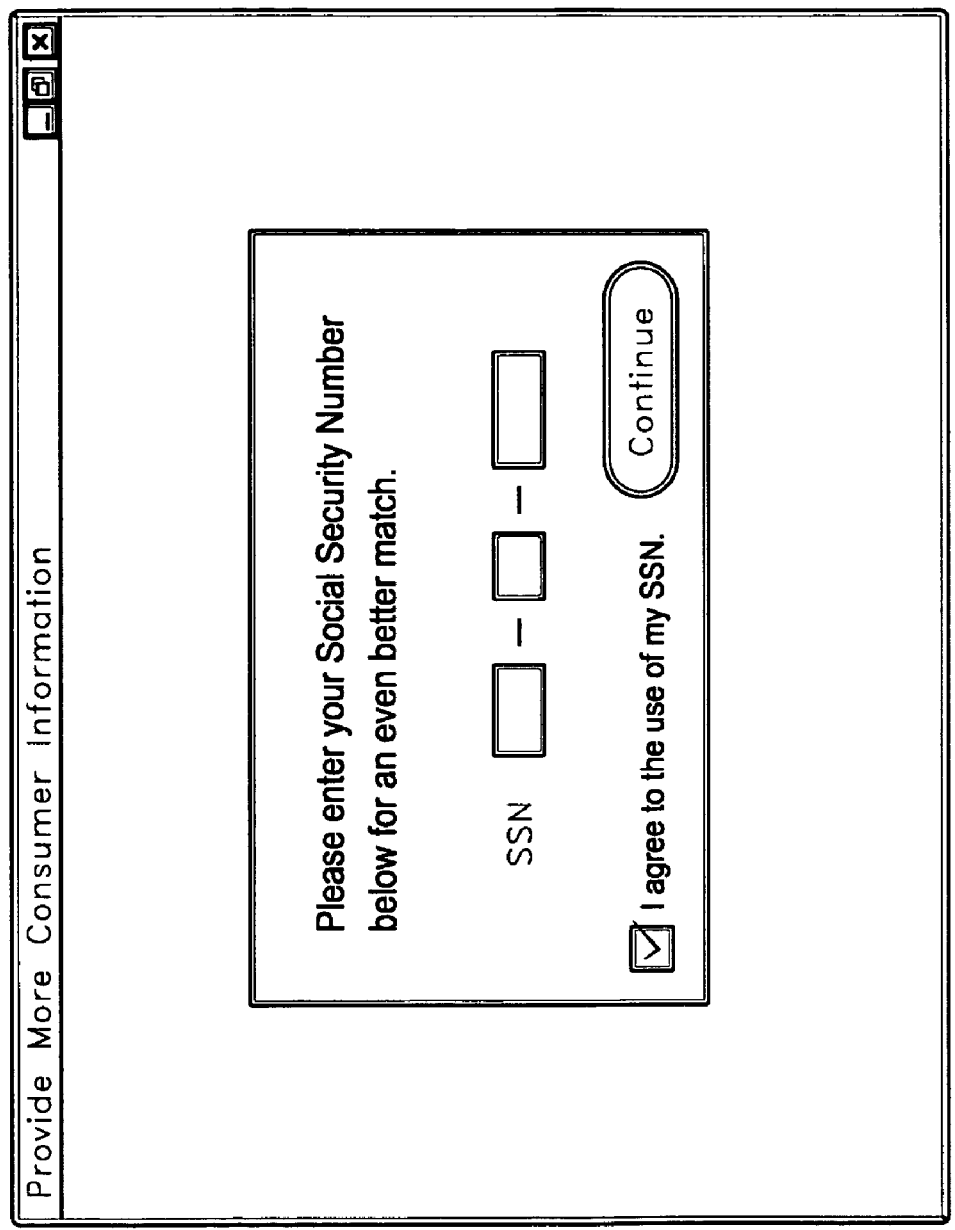
FIG. 8 is a simplified screen shot that requests that the consumer provide more detailed information to receive an even better match.

FIG. 8 is a simplified screen shot that requests that the consumer provide more detailed information to receive an even better match. In this embodiment, the request to provide more detailed information comes after a match has already occurred based on the basic information provided. Advantageously, this allows the system to send leads to the matched and selected vendors even if the consumer declines to enter the more detailed information. In the illustrated embodiment, the additional requested information is the consumer's Social Security number. The system may use the additional requested information to obtain still other information, such as all or part of a credit report, from a third party information provider. In one embodiment, the system provides a checkbox or other mechanism for the consumer to consent to such use of the consumer's information.

It is advantageous in many cases to obtain the consumer's Social Security number because a Social Security number uniquely identifies persons in the United States and serves as a key into many records accessible from third party information providers. Requesting a Social Security number is not required, however. Other identification numbers may be requested, such as, for example, driver's license numbers, membership numbers for clubs or organizations, or the like. Other sensitive information may also be requested, such as, for example, credit card numbers, bank account numbers, or the like. Some or all of the basic information or more detailed information may be transmitted over a secure connection to protect the consumer's information.

FIG. 9 is a simplified screen shot that asks the consumer to confirm the more detailed information. As illustrated, the screen asks the consumer to confirm his name, Social Security number, gross income, and whether there is a co-borrower. Some of the information to be confirmed may be part of the basic information. The screen of FIG. 9 also presents to the consumer the vendors with whom the consumer was matched. In one embodiment, the matching process occurs after the submission of the more detailed information on the screen of FIG. 8. As with the first matching process, the screen of FIG. 9 may also allow the consumer to choose a subset of the vendors to whom the consumer's information is to be transmitted.

As explained above, in one embodiment the lead enhancement system 100 may be used to enhance leads for the lending industry. In the context of the lending industry, one consumer characteristic that lead buyers often want to know is a consumer's credit score. As known to a skilled artisan, a consumer credit score provides a numerical value that represents the consumer's creditworthiness. In general, a high credit score indicates that, according to the model used for calculating the credit score, the consumer is a good credit risk and is not likely to default on a loan. A lower credit score generally indicates that the consumer is more likely to default on a loan.

While credit scores usually are precise three digit numbers, lenders that buy loan leads generally make general distinctions between consumers based on where each consumer's credit score falls within general ranges rather than making precise distinctions based on the exact credit score. For example, many lenders offer their best lending terms to consumers with excellent credit, which may be consumers that have a credit score of 700 or above. These lenders may not distinguish between one consumer with a 750 credit score and another consumer with a 760 credit score, as both consumers have excellent credit. Similarly, a lender may offer their second best terms to consumers with good credit, which may include consumers with credit scores between 660 and 700.

In one embodiment, the system 100 classifies credit scores into overlapping ranges that correspond generally to excellent, good, fair, needs to improve, or poor credit. In one embodiment, the ranges are as follows: excellent (above 680), good (600 to 700), fair (500 to 620), and poor (below 520). Overlapping ranges advantageously allow each lead to meet more lenders' criteria, thus allowing a lead generation company to sell more leads and enhancing many consumers' ability to get a loan. For example, if a consumer's credit score is on the border of excellent credit and good credit, a lead may be sent both to lenders that require good credit and to lenders that require excellent credit. Non-overlapping ranges may, on the other hand, prevent leads with borderline credit scores from being sent to lenders that require excellent credit.

In one embodiment, the system 100 requests that the consumer estimate his own creditworthiness. In this embodiment, it is advantageous to use creditworthiness ranges such as excellent, good, fair, and the like because consumer's often do not know their creditworthiness to the level of precision of a credit score. In one embodiment, the system 100 asks the consumer to voluntarily provide additional information, such as a Social Security number, so that the system 100 can obtain a more precise measure of creditworthiness, such as a credit score. Obtaining a more precise measure of creditworthiness is advantageous to lenders because lenders can have more trust in a measure obtained from an objective third party. Obtaining a more precise measure of creditworthiness also helps consumers in many cases. In some cases consumers underestimate their creditworthiness and may, for example, estimate that their creditworthiness is good when it actually is excellent based on their credit score. In such cases, the consumer may obtain a better match with lenders that are able to give the consumer a better deal than if the consumer had not allowed the system 100 to obtain a credit score.

In one embodiment, the system 100 allows vendors to specify their criteria for receiving leads based on predefined consumer characteristics or ranges of characteristics provided by the system 100. For example, in the context of loan leads, the system 100 may allow vendors to request leads for consumers that have excellent credit, as defined by a credit score of 680 or above. Alternatively or additionally, the system 100 may allow vendors to set their own ranges that do not necessarily correspond to a predefined range. For example, in one embodiment, a vendor may request leads for consumers with credit scores above 800. A skilled artisan will appreciate, in light of this disclosure, that we use credit score ranges only as an example of the type of criteria that may be set. Other criteria may be used, such as, for example, yearly income, type of product or service being sought, brand name of a product being sought, quality of the product being sought, amount of money the consumer is willing to spend for the product or service, or the like.

We have described embodiments of systems and methods in which a web-based application requests additional information so that the system can generate enhanced leads. As we have indicated, however, other ways to obtain the additional information exist and can be used. In alternatives of the systems and methods described above, upon entering basic information, the consumer 140 is contacted by telephone by a person at a call center. Alternatively, the consumer 140 may call the call center. In one embodiment, the consumer 140 calls the call center in response to a prompt by the system 100 to call the call center in order to provide additional information. In one embodiment, the system 100 allows the consumer 140 to enter information via a webpage but provides the alternative of allowing the consumer 140 to call a call center. In one embodiment, the consumer 140 is able to initiate the entire process by calling a call center, such that the consumer 140 provides both the basic information and more detailed information over the telephone to a call center operator.

In any case, whether the consumer 140 calls the call center or the call center calls the consumer 140, the person at the call center requests that the consumer 140 provide additional consumer information over the phone. If the consumer 140 provides the additional information over the phone, the person at the call center initiates an enhanced matching process for matching the consumer 140 with vendors. In one embodiment, the person at the call center identifies the matched vendors to the consumer 140 and allows the consumer 140 to choose a subset of the matched vendors to whom to have the consumer's information sent.

Embodiments in which a person at a call center contacts the consumer 140 by phone are advantageous in various respects. For example, some consumers may be unwilling to provide additional information when prompted by a computer but may be willing to provide additional information to a person over the phone. A person at a call center may be able to explain the reason for requesting additional information such that the consumer 140 understands more fully, or a person at a call center may simply be more persuasive than a computer. Accordingly, these embodiments provide an opportunity for the system 100 to increase the chance that the consumer 140 will provide additional information and thus allow for more sales of enhanced leads at higher prices.

Additionally, getting the additional consumer information over the phone enhances security because the call center operator receives voice authorization to get the information. Further, the call center operator can obtain voice authorization to use the information to pull a credit report or similar report. Advantageously, the call center operator need not request a Social Security number over the phone in order to obtain a credit report or similar report. Rather, in general the call center operator requests the consumer's name, birth date, and voice authorization to obtain the report.

Calling the consumer 140 by telephone has the additional advantage of verifying that the consumer 140 has provided legitimate contact information, thereby increasing the likelihood that the vendors will successfully contact the consumer 140. In one embodiment, if the call center operator determines that the consumer 140 has provided incorrect phone numbers, no lead is generated or forwarded to any vendors. This reduces the possibility that the lead generation company will have to refund lead fees.

A call center operator may call the consumer 140 in none, some, or all transactions. In one embodiment, a call center operator calls the consumer 140 in a given portion of transactions, such as half of the transactions. The transactions in which the call center operator calls the consumer 140 may be chosen randomly, by a preset selection method, or based at least in part on characteristics of the transaction. For example, the call center operator may call the consumer 140 for every other transaction. Alternatively or additionally, the system 100 may determine when to have a call center operator call the consumer 140 based on consumer characteristics or characteristics of the contact information that the consumer 140 entered. In one embodiment, the system 100 has the call center operator call the consumer 140 in transactions in which it is most likely that there is an error in the information entered by the consumer 140.

We have described the foregoing embodiments by way of example and not limitation. A skilled artisan will appreciate, in light of this disclosure, that the invention is not limited to the disclosed embodiments, but encompasses the disclosed embodiments individually, combinations of features of the disclosed embodiments, and variations of the disclosed embodiments that are apparent to a skilled artisan in light of this disclosure. For example, a skilled artisan will appreciate that many of the features described herein can be modified or omitted from certain embodiments without departing from the invention.

We claim:

1. A consumer lead enhancement system comprising:
   a vendor criteria database configured to store vendor criteria for each of a plurality of vendors, wherein the vendor criteria for each vendor includes standard criteria and enhanced criteria for matching consumer leads to the vendor and wherein the enhanced criteria includes at least one criterion that is not included in the standard criteria; and computer hardware in communication with the vendor criteria database and comprising at least one computer processor configured to cause the computer hardware to perform operations comprising:

requesting from a consumer a first set of consumer characteristics to which standard criteria in the vendor criteria database can be applied to match a standard consumer lead with one or more vendors;

presenting an option to the consumer to provide a second set of consumer characteristics to which enhanced criteria in the vendor criteria database can be applied to match an enhanced consumer lead with one or more vendors;

receiving from the consumer the first set of consumer characteristics;

if the consumer selects the option to provide the second set of consumer characteristics, receiving from the consumer the second set of consumer characteristics, generating an enhanced consumer lead, applying at least some of the enhanced criteria in the vendor criteria database to at least some of the second set of consumer characteristics to match the enhanced consumer lead with one or more vendors, and transmitting the enhanced consumer lead to the matched vendors; and if the consumer does not select the option to provide the second set of consumer characteristics, generating a standard consumer lead, applying at least some of the standard criteria in the vendor criteria database to at least some of the first set of consumer characteristics to match the consumer with one or more vendors, and transmitting the standard consumer lead to the matched vendors.

2. The system of claim 1, wherein the processor is configured to present the option of providing the second set of consumer characteristics after the consumer provides the first set of consumer characteristics.

3. The system of claim 1, wherein the system is configured to obtain at least one additional consumer characteristic from an information provider and to include the additional consumer characteristic in the first set of consumer characteristics or the second set of consumer characteristics.

4. The system of claim 3, wherein the second set of consumer characteristics includes a consumer identification and the system is configured to obtain at least one additional consumer characteristic from an information provider at least in part by providing the consumer identification to the information provider.

5. The system of claim 4, wherein the consumer identification comprises a Social Security number.

6. The system of claim 4, wherein the additional consumer characteristic includes a credit score.

7. The system of claim 1, wherein the second set of consumer characteristics provides a more precise match of the consumer lead with vendors than does the first set of consumer characteristics alone.

8. A consumer lead enhancement method comprising:

accessing a plurality of computer-executable instructions from at least one computer-readable medium; and executing the computer-executable instructions on at least one computer processor, thereby causing computer hardware to perform operations comprising:

receiving computer-readable data encoded with a first set of consumer characteristics having information about a consumer that is sufficient to generate a standard lead;

causing a computer to present an option for the consumer to provide a more detailed second set of consumer characteristics in order to be more precisely matched with vendors;

receiving computer-readable data indicative of whether a consumer accepts the option to provide a more detailed second set of consumer characteristics in order to be more precisely matched with vendors;

if the consumer accepts the option to provide the second set of consumer characteristics, receiving computer-readable data encoded with a second set of consumer characteristics having information about a consumer that is more detailed than the first set of consumer characteristics and that is sufficient to generate an enhanced lead;

if the consumer does not accept the option to provide the second set of consumer characteristics, matching the consumer with one or more vendors based at least in part on the first set of consumer characteristics and using standard vendor criteria, generating a standard lead, and transmitting the standard lead to one or more of the matched vendors; and if the consumer accepts the option to provide the second set of consumer characteristics, matching the consumer with one or more vendors based at least in part on the second set of consumer characteristics and using enhanced vendor criteria, generating an enhanced lead comprising at least part of the second set of consumer characteristics, and transmitting the enhanced lead to one or more of the matched vendors; wherein the enhanced vendor criteria includes at least one criterion that is not included in the standard vendor criteria.

9. The method of claim 8, further comprising receiving a selection of a subset of the matched vendors.

10. The method of claim 9, wherein transmitting the lead to one or more of the matched vendors comprises transmitting the lead to the selected subset of matched vendors.

11. A computer-readable medium storing computer-executable instructions that are configured, when executed by a computer, to perform the operations of:

receiving a first set of consumer characteristics having information about a consumer sufficient to generate a standard lead;

presenting an option to the consumer to provide a more detailed second set of consumer characteristics that are sufficient to generate an enhanced lead that includes additional information not in a standard lead;

determining that the consumer declines to provide the second set of consumer characteristics;

accessing standard vendor criteria from at least one computer-readable medium that stores the standard vendor criteria and separate enhanced vendor criteria, and using the standard vendor criteria to match the consumer to one or more vendors based at least in part on the first set of consumer characteristics;

transmitting a standard lead to at least one of the matched vendors, wherein the standard lead is generated at least in part by using the first set of consumer characteristics.

12. The computer-readable medium of claim 11, wherein the computer-executable instructions are further configured, when executed by a computer, to perform the operation of receiving a selection of a subset of the matched vendors, wherein the standard lead is transmitted to the selected subset of the matched vendors.

13. The computer-readable medium of claim 11, wherein determining that the consumer declines to provide a second set of consumer characteristics comprises receiving an indication from the consumer that the consumer declines to provide a second set of consumer characteristics.

14. The computer-readable medium of claim 11, wherein determining that the consumer declines to provide a second set of consumer characteristics comprises determining, based on an occurrence of a timeout, that the consumer declines to provide a second set of consumer characteristics.

* * * * *